US009116251B1

(12) United States Patent
Haddy (10) Patent No.: US 9,116,251 B1
(45) Date of Patent: Aug. 25, 2015

(54) BURIED ASSET DETECTION INCLUDING PORTABLE TRANSMITTER HOOKUP LOGGING

(71) Applicant: Alan Haddy, Naples, FL (US)

(72) Inventor: Alan Haddy, Naples, FL (US)

(*) Notice: Subject to any disclaimer, the term of this patent is extended or adjusted under 35 U.S.C. 154(b) by 0 days.

(21) Appl. No.: 14/720,340

(22) Filed: May 22, 2015

Related U.S. Application Data (63) Continuation-in-part of application No. 14/519,910, filed on Oct. 21, 2014, which is a continuation of application No. 14/226,397, filed on Mar. 26, 2014, now Pat. No. 8,872,626, which is a continuation-in-part of application No. 14/060,301, filed on Oct. 22, 2013, now Pat. No. 8,823,492.

(51) Int. Cl.
*G01V 3/10* (2006.01)
*G01V 3/38* (2006.01)

(52) U.S. Cl.
CPC ... *G01V 3/10* (2013.01); *G01V 3/38* (2013.01)

(58) Field of Classification Search
USPC ............................................................ 702/2
See application file for complete search history.

(56) References Cited

U.S. PATENT DOCUMENTS

| 3,192,747 | A | 7/1965 | Etal |
| 7,311,526 | B2 | 12/2007 | Rohrbach |
| 7,517,222 | B2 | 4/2009 | Rohrbach |
| 8,368,518 | B1* | 2/2013 | Castrovinci ............... 340/10.51 |
| 8,435,042 | B2 | 5/2013 | Rohrbach |
| 8,612,271 | B2* | 12/2013 | Nielsen et al. .............. 705/7.11 |
| 2005/0203681 | A1* | 9/2005 | Minor, Jr. ........................ 701/23 |
| 2007/0174467 | A1* | 7/2007 | Ballou et al. .................. 709/227 |
| 2009/0121933 | A1 | 5/2009 | Tucker |
| 2009/0167308 | A1* | 7/2009 | Lomes .......................... 324/326 |
| 2010/0045517 | A1* | 2/2010 | Tucker et al. ............ 342/357.08 |
| 2010/0211354 | A1* | 8/2010 | Park et al. ..................... 702/165 |
| 2013/0065406 | A1 | 3/2013 | Rohrbach |
| 2013/0325542 | A1* | 12/2013 | Tucker et al. ................ 705/7.23 |
| 2014/0125457 | A1* | 5/2014 | Rushing ...................... 340/5.85 |

\* cited by examiner

*Primary Examiner* — Tung S Lau
(74) *Attorney, Agent, or Firm* — Mark Terry (57) ABSTRACT

A method on a server for logging and recalling data gathered from a buried asset location procedure is disclosed. The method includes receiving a group of buried asset data points corresponding to a particular buried asset, receiving at a different time a portable transmitter hookup definition associated with the group of buried asset data points, searching for buried asset data points that match, within predefined parameters, the portable transmitter hookup definition, storing the portable transmitter hookup definition in association with the matching points, creating a buffer zone around the portable transmitter hookup, and transmitting to a mobile device the buffer zone for the portable transmitter hookup.

17 Claims, 7 Drawing Sheets

BURIED ASSET DETECTION INCLUDING PORTABLE TRANSMITTER HOOKUP LOGGING

CROSS-REFERENCE TO RELATED APPLICATIONS

This patent application is a continuation in part of, and claims priority to, patent application Ser. No. 14/519,910 filed Oct. 21, 2014, which is a continuation in part of, and claims priority to, patent application Ser. No. 14/226,397 filed Mar. 26, 2014, which is a continuation in part of patent application Ser. No. 14/060,301 filed Oct. 22, 2013. The subject matter of patent application Ser. Nos. 14/060,301, 14/226,397 and 14/519,910 are hereby incorporated by reference in their entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The technical field relates generally to the detection and identification of buried assets (i.e., underground utility lines) and, more specifically, to processes for improving the storage and recall of data gathered during the detection of buried assets.

BACKGROUND

Utility lines, such as lines for telephones, electricity distribution, natural gas, cable television, fiber optics, Internet, traffic lights, street lights, storm drains, water mains, and wastewater pipes, are often located underground. Utility lines are referred to as "buried assets" herein. Consequently, before excavation occurs in an area, especially an urban area, an excavator is typically required to clear excavation activities with the proper authorities and service providers. The clearance procedure usually requires that the excavator contact a central authority (such as "One Call", "811" and "Call Before You Dig," which are well known in the art) which, in turn, sends a notification to the appropriate utility companies. Subsequently, each utility company must perform a buried asset detection procedure, which includes having a field technician visit the proposed excavation site, detecting the relevant buried assets and physically marking the position of the buried asset using temporary paint or flags.

Usually, a technician visiting a proposed excavation site utilizes a portable electronic device known as a pipe or cable locator, which may be a commercial, off-the-shelf, two-part receiver/transmitter kit that is employed to detect and identify the position of the buried assets. This is typically achieved by connecting the transmitter part to a suitable connection point (i.e., pedestal, hydrant, manhole, removable cover, lid, junction box or other access point) of the buried asset, wherein the transmitter sends a signal of a specific frequency onto the buried conductor. Subsequently, the receiver device is "tuned" to the specific frequency in order to locate the resulting electromagnetic signal radiating from the buried conductor, thus enabling the position and route of the buried pipe/cable to be marked with paint or flags above surface.

The aforementioned procedure, however, takes time and effort because the technician must find the correct and optimal place to connect the portable transmitter to the connection point of the buried asset being sought. This entails looking for places where conductors, pipes, cables or ducts are accessible from the surface and then connecting the portable transmitter to said point. Often, the technician may spend a significant amount of time looking for the portable transmitter hookup or access point among grass, trees, bushes, under asphalt, on utility poles, and other conductors, pipes, cables and wires. Once the transmitter has been connected, the field technician will not know for sure that this is the correct point of connection until the buried asset has been successfully located with the receiver. Frequently, the transmitter must be relocated and reconnected to a different connection point before the technician finds the optimal or correct connection point.

Utility companies and are faced with increasing requests to locate and mark the position of their buried assets to avoid damage from third party excavators, contractors and underground horizontal boring operations. Locating the same particular buried asset is often performed on the same tract of land but at different times, with weeks, months or years between subsequent locate operations. However, there is currently no way for a locate technician performing a subsequent locate procedure to capitalize or utilize previous locate procedure knowledge to facilitate the current locate procedure at hand. Further, it is common for one field technician to locate multiple buried asset types in the same geographic vicinity (i.e., water, gas, electric and telecom services). The invention describes how to record and match the type of utility being located with the corresponding and various portable transmitter connection points.

Presently, the inability to use previous locate data to facilitate a current locate procedure can increase the likelihood of erroneous locate data being logged. As such, this leads to increased costs for utility companies and service providers, as well as potential safety hazards to workers and the general public.

Therefore, a need exists for improvements over the prior art, and more particularly for more efficient methods and systems for logging and recalling data gathered during a buried asset locate procedure.

SUMMARY

A method and system for logging and recalling data gathered from a buried asset location procedure is provided. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a method on a server for logging and recalling data gathered from a buried asset location procedure is provided that solves the above-described problems. The method includes receiving, via a communications network communicatively coupled with the server, a group of buried asset data points corresponding to a particular buried asset sought by an operator, wherein each of said buried asset data points includes geographical location data and a time and date stamp; storing, in an attached database, one or more records corresponding to the group of buried asset data points; receiving at a different time, via the communications network, a portable transmitter hookup definition associated with the group of buried asset data points, wherein the portable transmitter hookup definition includes a time and date stamp, geographical location data, a buried asset type indicator, wherein the time and date stamp is different from the time and date stamps of the group of buried asset data points; searching the attached database for one or more matching records with buried asset data points having time and date stamps and geographical location data that match, within predefined parameters, the time and date stamp and the geographical location data of the portable transmitter hookup definition; storing, in the attached database, the portable transmitter hookup definition in association with the one or more matching records; creating a first data structure that represents a two dimensional area comprising a buffer zone around the geographical location data of the portable transmitter hookup definition, and storing, in the attached database, the first data structure in association with the one or more matching records; receiving from a mobile computing device, via the communications network, a request including current geographical location data of the mobile computing device and a buried asset type indicator; searching the attached database for a matching record with a buried asset type indicator and geographical location data that matches, within predefined parameters, the buried asset type indicator and current geographical location data received from the mobile computing device, and transmitting to the mobile computing device, via the communications network, the first data structure corresponding to the matching record.

BRIEF DESCRIPTION OF THE DRAWINGS

The accompanying drawings, which are incorporated in and constitute a part of this disclosure, illustrate various example embodiments. In the drawings.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

The present invention improves over the prior art by providing a more efficient, safe and precise way of locating a particular buried that has previously been located by a locate technician. The example embodiments leverage the wide availability of previously stored buried asset data points and networked mobile phones/devices, to log data collected during a locate procedure and then subsequently provide that data to parties with a need to know the location of a corresponding buried asset. The disclosed embodiment log buried asset data points and portable transmitter hookup information, such that parties at a later time can find the corresponding buried asset and the corresponding portable transmitter hookup site without having to engage in a full locate procedure. The disclosed embodiments reduce or eliminate the possibility that the locate technician may accidentally misidentify a buried asset or accidentally hook up to an incorrect portable transmitter hookup site. This feature results in more safe, precise and accurate results by the field technician, in addition to saving time and effort on the technician's part. The example embodiments further reduce the number of false identifications of a buried asset's location. This decreases the costs associated with buried asset detection in relation to the central authority.

Figure 1A:
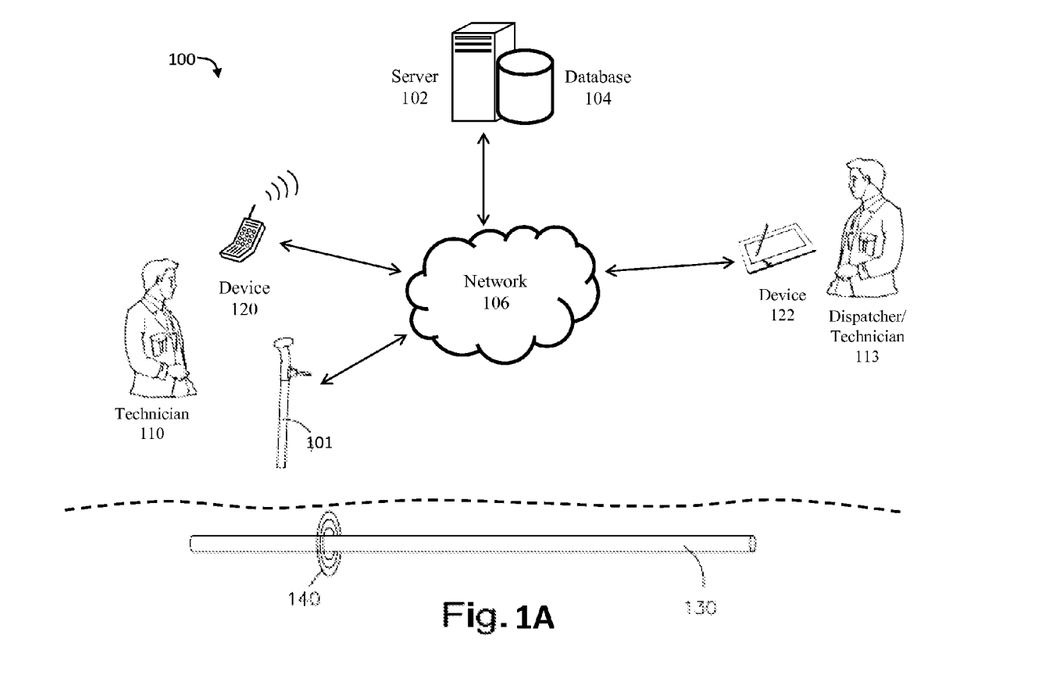
FIG. 1A is a diagram of an operating environment that supports a method and system for logging and recalling data gathered from a buried asset location procedure, according to an example embodiment.

FIG. 1A is a diagram of an operating environment 100 that supports a method and system for logging and recalling data gathered from a buried asset location procedure. The server 102 may be communicatively coupled with a communications network 106, according to an example embodiment. The environment 100 may comprise mobile computing devices 120, 122, which may communicate with server 102 via a communications network 106. Mobile computing devices 120, 122 may comprise a cellular/mobile telephone, smart phone, tablet computer, laptop computer, handheld computer, wearable computer, or the like. Devices 120, 122 may also comprise other computing devices such as desktop computers, workstations, servers, and game consoles, for example. The mobile computing devices 120, 122 may be connected either wirelessly or in a wired or fiber optic form to the communications network 106. Communications network 106 may be a packet switched network, such as the Internet, or any local area network, wide area network, enterprise private network, cellular network, phone network, mobile communications network, or any combination of the above.

FIG. 1A also shows a locator 101, which detects and measures radio frequency and/or electromagnetic signals 140 emanating from a buried asset 130. In one embodiment, locator 101 includes all of the functions of a conventional locator device, which is well known in the art. Locator 101 is also connected either wirelessly or in a wired or fiber optic form to the communications network 106. Locator 101 may comprise a computing device 600.

The environment 100 shows that mobile computing device 120 is operated by a technician or operator 110 (i.e., a field technician). Device 122 may also be operated by a technician or a dispatcher 113 that dispatches or provides support to a technician 110 (alternatively, the technician 110 may be the same person as technician 113). Server 102, locator 101 and devices 120, 122 may each comprise a computing device 600, described below in greater detail with respect to FIG. 6.

In another embodiment, the devices 120, 122 also calculate current geographical position (otherwise referred to as geographical location data) using an on-board processor or a connected processor. In one embodiment, the devices 120, 122 may calculate current position using a satellite or ground based positioning system, such as a Global Positioning System (GPS) system, which is a navigation device that receives satellite or land based signals for the purpose of determining the device's current geographical position on Earth. A GPS receiver, and its accompanying processor, may calculate latitude, longitude and altitude information. In this embodiment, a radio frequency signal is received from a satellite (such as 160 in FIG. 1B) or ground based transmitter comprising a time the signal was transmitted and a position of the transmitter. Subsequently, the devices 120, 122 calculate current geographical location data of the device based on the signal. In another embodiment, the devices 120, 122 calculate current geographical location using alternative services, such as control plan locating, GSM localization, dead reckoning, or any combination of the aforementioned position services. The term spatial technologies or spatial processes refers generally to any processes and systems for determining one's position using radio signals received from various sources, including satellite sources, land-based sources and the like.

Server 102 includes a software engine that delivers applications, data, program code and other information to networked devices, such as 120, 122. The software engine of server 102 may perform other processes such as transferring multimedia data in a stream of packets that are interpreted and rendered by a software application as the packets arrive. FIG. 1A further shows that server 102 includes a database or repository 104, which may be a relational database comprising a Structured Query Language (SQL) database stored in a SQL server. Mobile computing devices 120, 122 may also include their own database, either locally or via the cloud. The database 104 may serve buried asset data, buffer zone data, portable transmitter hookup data, as well as related information, which may be used by server 102 and mobile computing devices 120, 122.

Server 102, mobile computing devices 120, 122 and locator 101 may each include program logic comprising computer source code, scripting language code or interpreted language code that perform various functions of the disclosed embodiments. In one embodiment, the aforementioned program logic may comprise program module 607 in FIG. 6. It should be noted that although FIG. 1A shows only two mobile computing devices 120, 122, one locator 101 and one server 102, the system of the disclosed embodiments supports any number of servers, locators and mobile computing devices connected via network 106. Also note that although server 102 is shown as a single and independent entity, in one embodiment, server 102 and its functionality can be realized in a centralized fashion in one computer system or in a distributed fashion wherein different elements are spread across several interconnected computer systems.

Environment 100 may be used when devices 120, 101 engage in buried asset detection activities that comprise reading, generating, and storing buried asset data and related information, such as buffer zone data and portable transmitter hookup data. Various types of data may be stored in the database 104 of server 102 (as well as data storage on devices 120, 122 and locator 101) with relation to a buried asset that has been detected and located. For example, the database 104 (or devices 120, 122 and locator 101) may store one or more records for each buried asset, and each record may include one or more buried asset data points. A buried asset data point may include a current time, a textual map address, and location data or position data, such as latitude and longitude coordinates, geographical coordinates, an altitude coordinate, or the like. A buried asset data point may also include depth measurement data, electromagnetic signal measurement data (such as electrical current measurement data, resistance measurement data, impedance measurement data, electrical signal magnitude measurement data, electrical signal frequency measurement data, electrical signal voltage measurement data, etc.), direction data and orientation data. Each record may include data for one buried asset data point.

A buried asset data point may also include a precision data value corresponding to any piece of information associated with a buried asset data point, such as the geographical coordinate or. A precision data value is a value that represents the quality or level of precision of a piece of information, such as a geographical coordinate. All sensors and devices that read physical quantities have a certain amount of measurement error or observational error. A precision data value represents the amount or magnitude of the measurement error or observational error of a sensor or device at one time. In one embodiment, a precision data value is a numerical value, such as a real number from 0 to 1.0 (with a variable number of decimal points) wherein zero represents perfect precision, 0.5 represents a precision that is 50% off from a true value, 0.75 represents a precision that is 75% off from a true value, etc. In another embodiment, a precision data value is an alphanumeric value (such as a word or other ASCII string) that corresponds (according to a lookup table or other correspondence table) to a predefined amount of precision. In another embodiment, a precision data value is any set of values that may be sorted according to ascending or descending value. Thus, in this embodiment, precision data values may have ascending and descending values.

In one embodiment, the precision data value is inversely proportional to the level of precision of quality of a piece of information, such as a geographical coordinate. Thus, when there is a large margin of error or a low confidence level in a piece of information, then the precision data value is high and the quality or level of precision of the information is low. Conversely, when there is a small margin of error or a high confidence level in a piece of information, then the precision data value is low and the quality or level of precision of the information is high.

With regard to geographical coordinates, HDOP, VDOP, PDOP, and TDOP values (Horizontal, Vertical, Positional and Time Dilution of Precision, respectively) are precision data values well known in the art for representing the quality or level of precision of a geographical coordinate. Also with regard to geographical coordinates, values representing the quality or level of precision of a geographical coordinate may rely on whether a differential correction technique (such as differential GPS) was used in calculating the coordinate. The Differential Global Positioning System (DGPS) is an enhancement to Global Positioning System that provides improved location accuracy. DGPS uses a network of fixed, ground-based reference stations to broadcast the difference between the positions indicated by the satellite systems and the known fixed positions. As such, if DGPS was used to calculate a geographical coordinate, then the precision data value of the coordinate may reflect that fact. For example, the precision data value may indicate higher accuracy if DGPS was used.

In one embodiment, Precise Point Positioning (PPP) is used to generate a precision data value representing the quality or level of precision of a geographical coordinate. PPP is a global navigation satellite system positioning method to calculate precise positions up to few centimeter level using a single receiver in a dynamic and global reference framework. The PPP method combines precise clocks and orbits calculated from a global network to calculate a precise position with a single receiver.

A buried asset data point may also include a precision data value corresponding to any piece of information associated with a buried asset data point, such as a current time, a textual map address, depth measurement data, electrical signal measurement data (such as electrical current measurement data, signal strength data, resistance measurement data, impedance measurement data, electrical signal magnitude measurement data, electrical signal frequency measurement data, electrical signal voltage measurement data, electromagnetic vector data, etc.), direction data (left or right indicators that direct the technician to the location of the buried asset), orientation data, and location data or position data, such as latitude and longitude coordinates, geographical coordinates, an altitude coordinate, or the like.

In another example, the database 104 (or devices 120, 122 and locator 101) may store a portable transmitter hookup definition associated with the group of buried asset data points, wherein the portable transmitter hookup definition includes a time and date stamp, geographical location data, a buried asset type indicator, a frequency indicator and optionally a precision data value corresponding to the geographical location data. Recall the procedure wherein the technician connects (inductively, for example) the buried asset 130 being sought to a portable transmitter 190 (see FIG. 1B) that transmits a predefined signal into the buried asset. The transmitter 190 puts an electrical signal onto the buried asset 130, while the locator 101 picks up said signal, allowing the technician 110 to trace the signal's path and follow the asset being located. The electromagnetic field 140 created by the transmitter 190 can usually be set to a specific frequency, depending on the type of conductor in the asset. Frequency choices can range from less than 1 kilohertz to about 480 kHz. The location of the connection or hookup point 180 (see FIG. 1B) is referred to as the portable transmitter hookup location or point, and the devices 120, 122 and/or locator 101 may log geographical location data for said hookup point 180. The devices 120, 122 and/or locator 101 may also log a time and date stamp, a buried asset type indicator and a frequency indicator for said hookup point 180, wherein the buried asset type indicator pertains to the type of buried asset (cable, pipe, sewer, electric, data, etc.) and a frequency indicator pertains to the frequency of the signal emitted by the transmitter 190. In one embodiment, the type of buried asset indicator and the frequency indicator are either automatically set by devices 120, 122 and/or locator 101 or entered by the technician 110 into said devices via an interface. In another embodiment, any of the data mentioned above may be stored in a separate file or record that is associated with a corresponding group of buried asset data points.

Figure 1B:
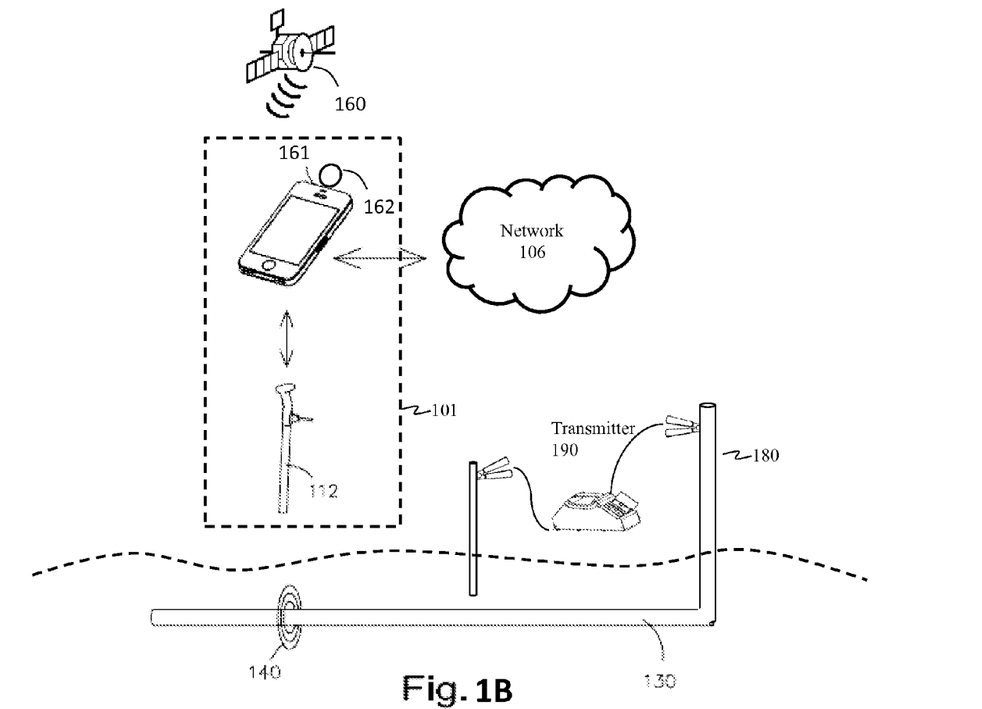
FIG. 1B is a diagram providing more detail of the locator of FIG. 1A, according to an example embodiment

FIG. 1B is a diagram providing more detail of one embodiment of the locator 101 of FIG. 1A. FIG. 1B shows that in one embodiment, the locator 101 comprises a mobile computing device 161 operated by a technician or operator and includes an antenna array 112, which may be communicatively coupled, either wirelessly or in a wired or fiber optic form, to the mobile computing device 161. FIG. 1B shows that antenna array 112 may be a component including one or more sensors that detect and measure radio frequency and/or electromagnetic signals 140 emanating from a buried asset 130. In one embodiment, array 112 includes all of the functions of a conventional locator device, which is well known in the art.

In one embodiment, FIG. 1B shows that device 161 includes a peripheral 162, which may be a high accuracy or high precision satellite or ground based positioning system module that provides positional data of greater accuracy to device 161. In this embodiment, the functions related to calculating current geographical position are performed by device 162 instead of, or in conjunction with, device 161. In addition to satellite(s) 160, peripheral 162 may collect data from other sources, such as land-based position data providers that broadcast position data over radio frequency, or additional constellations of satellites. Alternatively, in lieu of device 161, array 112 and peripheral 162, the technician may utilize a single, integrated locator device that detects and identifies buried assets using radio frequency and/or electromagnetic sensors, and which further performs the functions of device 161, array 112 and peripheral 162, as described herein. In this alternative, all of the functions of 161, 112, and 162 are provided by one, single, integrated device (indicated by 101 in FIG. 1A) handled by technician 110.

Figure 2:
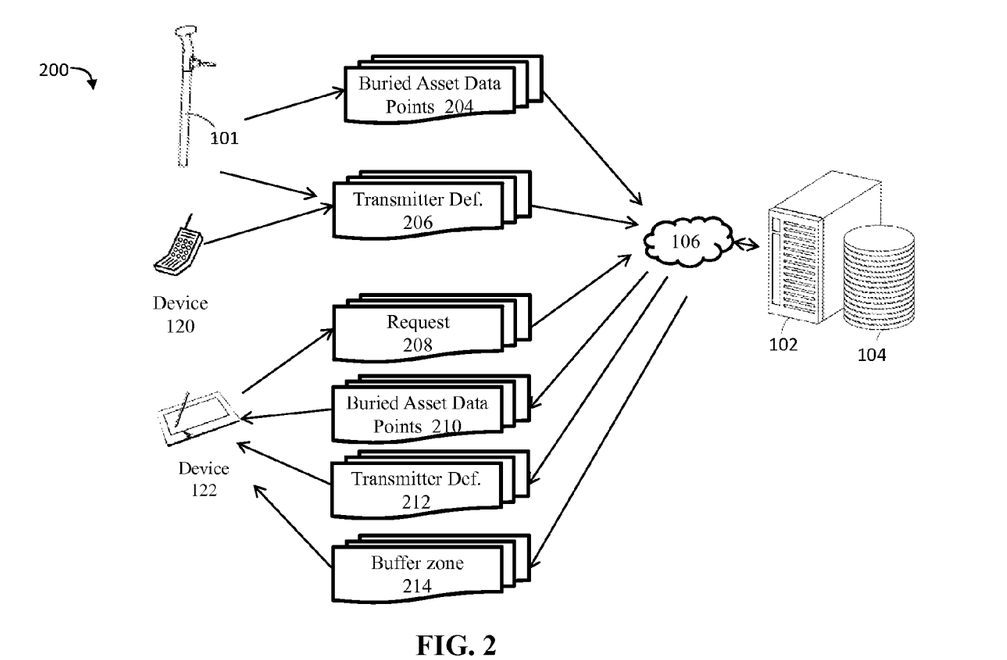
FIG. 2 is a diagram showing the data flow of the general process for logging and recalling data gathered from a buried asset location procedure, according to an example embodiment.
Figure 3:
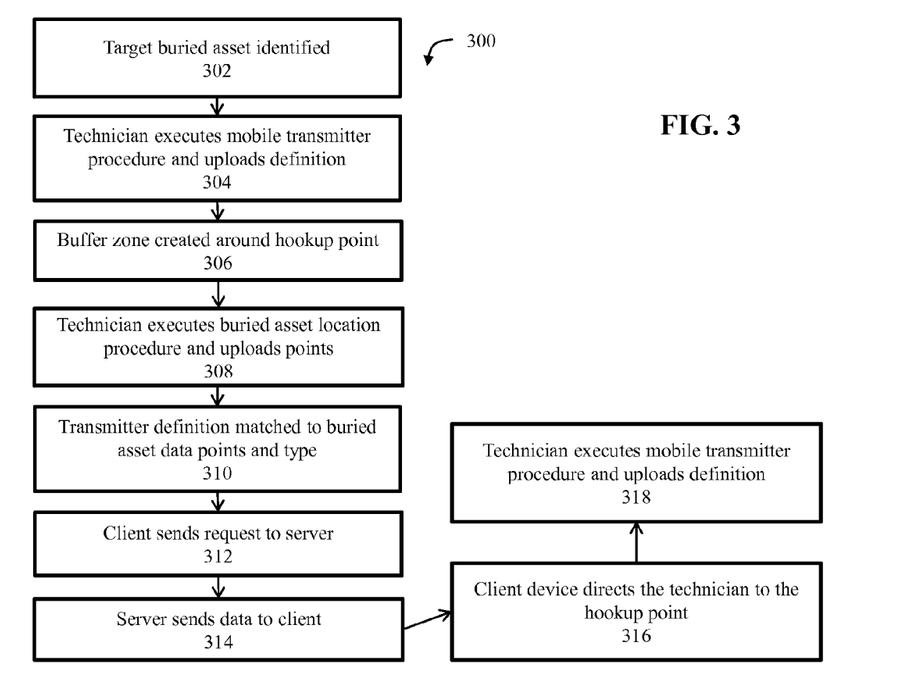
FIG. 3 is a flow chart showing the control flow of the process for logging and recalling data gathered from a buried asset location procedure, according to an example embodiment.

FIG. 3 is a flow chart showing the control flow of the process 300 for logging and recalling data gathered from a buried asset location procedure, according to an example embodiment. Process 300 describes the steps that occur when the locate technician 110 is seeking a particular target buried asset 130 that may be located within an area including multiple buried assets, giving rise to a situation where a portable transmitter hookup procedure is necessary. The process 300 is described with reference to FIG. 2, which shows the general data flow 200 of the process 300, as well as FIGS. 1A, 1B, 3, 4, and 5.

Process 300 starts with step 302 wherein a target buried asset 130, which is the buried asset the technician 110 is seeking, is identified to the technician 110 and/or the server 102. In one embodiment, this step is accomplished by the reception of the server 102 of a work ticket specifying that a locate action must be performed at a particular location for a particular buried asset identified by a unique identifier, type of buried asset, expected reading for buried asset, or the like. In another embodiment, this step is accomplished by the server 102 receiving a command from the technician 110, wherein the device 120 sends a unique identifier for the target buried asset 130 to the server 102 via network 106. Step 302 may be performed while the technician 110 is located on site in the vicinity of the target buried asset, while the technician is at work or headquarters, while the technician is at home, on the road, or at any other location. In another embodiment, step 302 may be performed automatically when the technician 110 arrives at the vicinity of the target buried asset, the device 120 sends its current geographical location to the server 102 and the server 102 determines which buried assets are located at said location.

Subsequently, in step 304, the technician performs a portable transmitter hookup procedure. This procedure includes having the technician 110 hook-up his portable transmitter 190 to a buried asset connection point (see FIG. 1B). Also in this step, the technician 110 (or another person) uses the devices 120, 122 and/or locator 101 to generate and log a portable transmitter hookup definition, comprising geographical location data for said hookup point 180, a time and date stamp, a buried asset type indicator, a frequency indicator for said hookup point 180, and optionally a precision data value corresponding to the geographical location data. In one embodiment, the type of buried asset indicator and the frequency indicator are either automatically set by devices 120, 122 and/or locator 101 or entered by the technician 110 into said devices via an interface. Subsequently, the technician 110 uses devices 120, 122 and/or locator 101 to upload the portable transmitter hookup definition 206 to the server 102 via network 106. The point in time when the definition 206 and other related data are taken or logged may not be the same as the time of logging of the buried asset data points (see below). Also, the geographical location of said hookup point 180 may not be the same as the geographical location of the buried asset data points. The server 102 receives the definition 206 and other related data and creates records in the database 104 to hold said data.

In step 306, the server 102 generates a first data structure that represents a two dimensional area comprising a buffer zone around the geographical location data of the portable transmitter hookup definition of the hookup point 180, as described more fully below with reference to FIG. 4. In one alternative, the server 102 generates a first data structure that represents a two dimensional area comprising a buffer zone around the geographical location data of the portable transmitter hookup definition, based on the precision data value corresponding to the geographical location data of the hookup point 180, also as described more fully below with reference to FIG. 4. In yet another alternative, the server 102 generates a first data structure that represents a three dimensional surface comprising a buffer zone around the geographical location data of the portable transmitter hookup definition.

In step 308, the technician performs a buried asset location procedure using his locator 101 and generates buried asset data and/or buried asset data points 204, which are uploaded to the server 102 via network 106. The device 101 may utilize the antenna array 112 to read raw analog signals 140 emanating from the target buried asset 130. Based on the data it has received and calculated, device 101 calculates one or more buried asset data points 204 for the target buried asset. Upon generating the buried asset data points, the technician may place physical markings on the ground corresponding to each point, such as a flag, a paint mark or a combination of the two. The server 102 receives the buried asset data and/or buried asset data points 204 and creates records in the database 104 to hold said data.

In step 310, the server 102 searches the attached database 104 for one or more matching records with buried asset data points having time and date stamps and geographical location data that match, within predefined parameters, the time and date stamp and the geographical location data of the definition 206. Said predefined parameters may comprise a predefined maximum distance and a predefined maximum time period. Thus, a candidate buried asset data point may be deemed to match a candidate definition 206 if: 1) the time and date of the buried asset data point is within the predefined maximum time period of the time and date of the candidate definition 206 and 2) the geographical location of the buried asset data point is within the predefined maximum distance of the geographical location of the candidate definition 206. Subsequently, the server 102 stores, in the attached database 104, the definition 206 in association with records that matched the definition. The server 102 may store the definition and the related data in the same record that houses the matching buried asset data point, or the server 102 may store the definition and the related data in a separate record that is associated (such as linked) to the record that houses the matching buried asset data point. Also the server 102 may store the first data structure in database 104 in association with the one or more matching records.

At a future date, a technician (which may or may not be the same technician as the technician of steps 302-308, in step 312, executes a client application executing on the computer 122, which is configured for displaying buried asset data (see FIG. 5), and transmits to server 102 via network 106 a request 208. In one embodiment, the request includes a current geographical location of the device 122 and a buried asset type indicator. In another embodiment, the request 208 includes a unique identifier for the target buried asset 130 being sought.

In step 314, the server 102 receives the request, and searches the attached database 104 for a matching record with data that matches the data in request 208. In one embodiment, in step 314 the server 102 searches for a record that matches the geographical location of the device 122 and the buried asset type indicator received in step 312. In another embodiment, in step 314 the server 102 searches for a record that matches the unique identifier for the target buried asset 130 received in step 312. Further, in step 314, the server transmits to the client application, via network 106, one or more of the following data from the matching record: the buffer zone 214, a plurality of buried asset data points 210, and a transmitter definition 212.

Figure 5:
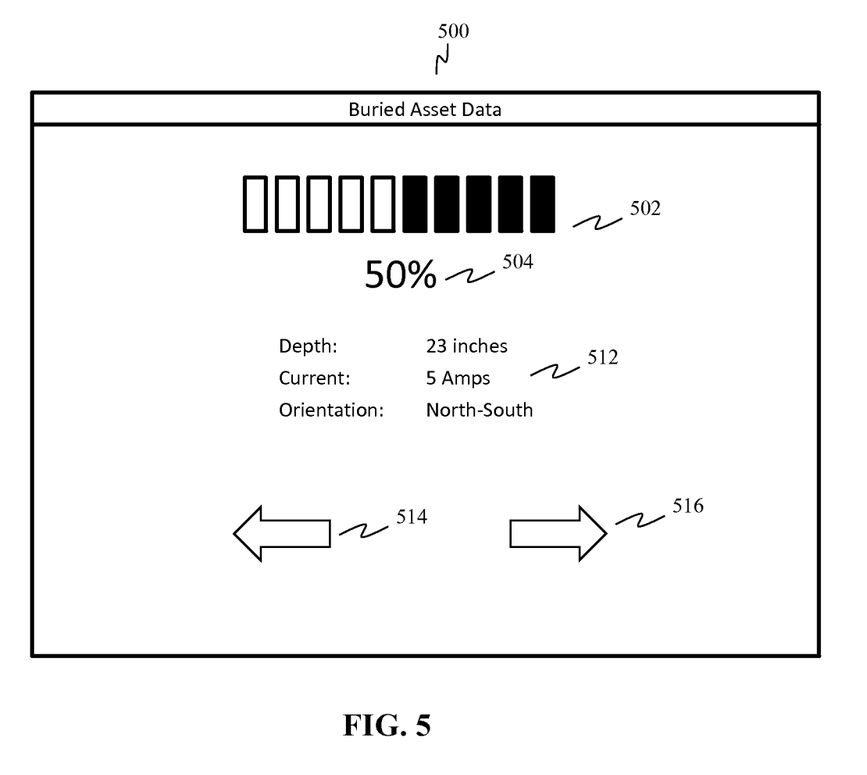
FIG. 5 is an illustration of a graphical user interface used for displaying data directing a technician to a portable transmitter hookup location, according to an example embodiment.

In step 316, the client application receives the data sent in step 314 corresponding to the matching record, and displays data directing the technician to the hookup point 180 or the corresponding buffer zone (see FIG. 5 for a more detailed explanation). In step 318, the technician proceeds to execute a portable transmitter hook-up procedure, as in step 304, and a buried asset location procedure, as in step 308.

Figure 4:
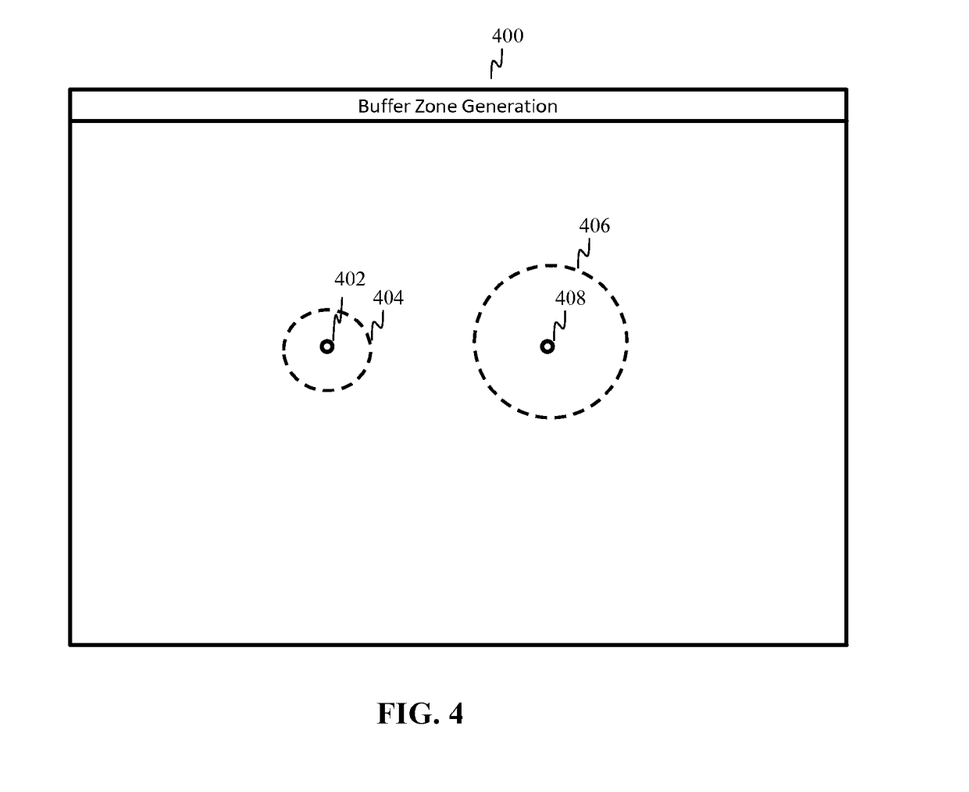
FIG. 4 is an illustration showing the process of creating a buffer zone, according to an example embodiment.

FIG. 4 is an illustration showing the process of how a buffer zone is created around a point, according to an example embodiment. In FIG. 4, the GUI 400 shows that buried asset data points 402 and 408 are displayed according to their corresponding geographical coordinate data. The server 102 then identifies the precision data value corresponding to each buried asset data point. In GUI 400, a precision data value that represents greater precision results in a smaller buffer zone around said point, while a precision data value that represents lower precision results in a greater buffer zone around said point. Thus, GUI 400 shows that point 402 has a precision data value that represents greater precision, thereby resulting in a smaller buffer zone 404 around said point, while point 408 has a precision data value that represents lower precision, thereby resulting in a greater buffer zone 406 around said point.

FIG. 5 is an illustration of a graphical user interface used for data directing a technician to a portable transmitter hookup location, according to an example embodiment. The graphical user interface 500 may be viewed on device 122, as well as devices 101, 120 or 190. The interface 500 may display buried asset data 512 and sensor readings. Recall that buried asset data may include depth, position, electrical signal measurement (such as current, resistance, impedance, magnitude, frequency, voltage, etc.), direction and orientation. Interface 500 may also include a graphic 502 that indicates the signal strength of the buried asset being detected (such as a meter reading comprising ten bars), and a numerical indicator 504 that indicates the signal strength of the buried asset being detected. In one embodiment, the interface receives human readable buried asset data and based on the data received, the interface displays the appropriate graphic 502 or numerical indicator 504 to display in interface 500. For example, if the interface receives human readable buried asset data indicating 50% signal strength, the interface displays the appropriate graphic 502 to display in interface 500 is five out of ten bars, which graphically indicates 50%. Lastly, the interface 500 may also include left and right arrows 514, 516, which points the technician 110 in the direction of the location of the hookup point 180 or the buffer zone surrounding the hookup point 180, based on the current geographical location of the device on which the interface 500 is viewed.

Left and right arrows 514, 516, indicate to the technician 110 the direction in which the device should be moved in order to find the hookup point 180.

Figure 6:
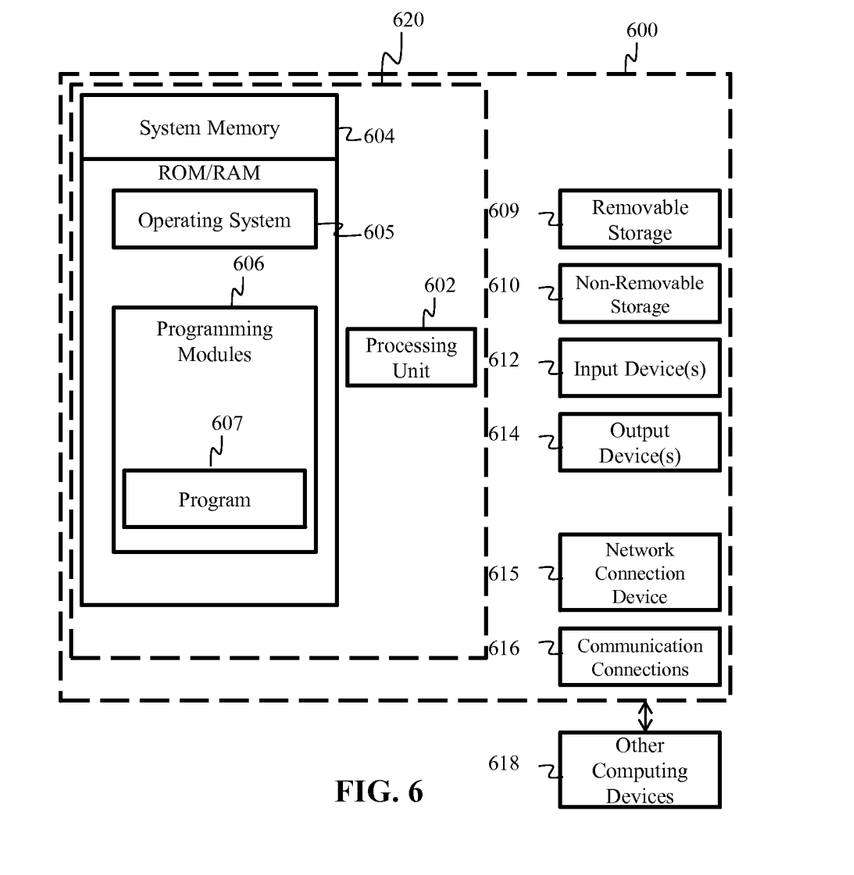
FIG. 6 is a block diagram of a system including a computing device, according to an example embodiment.

FIG. 6 is a block diagram of a system including an example computing device 600 and other computing devices. Consistent with the embodiments described herein, the aforementioned actions performed by server 102, devices 120, 122, locator 101, 190 and antenna array 112 may be implemented in a computing device, such as the computing device 600 of FIG. 6. Any suitable combination of hardware, software, or firmware may be used to implement the computing device 600. The aforementioned system, device, and processors are examples and other systems, devices, and processors may comprise the aforementioned computing device. Furthermore, computing device 600 may comprise an operating environment for system 100 and process 300, as described above. Process 300 may operate in other environments and are not limited to computing device 600.

With reference to FIG. 6, a system consistent with an embodiment of the invention may include a plurality of computing devices, such as computing device 600. In a basic configuration, computing device 600 may include at least one processing unit 602 and a system memory 604. Depending on the configuration and type of computing device, system memory 604 may comprise, but is not limited to, volatile (e.g. random access memory (RAM)), non-volatile (e.g. read-only memory (ROM)), flash memory, or any combination or memory. System memory 604 may include operating system 605, and one or more programming modules 606. Operating system 605, for example, may be suitable for controlling computing device 600's operation. In one embodiment, programming modules 606 may include, for example, a program module 607 for executing the actions of server 102, devices 120, 122, locator 101, 190 and antenna array 112. Furthermore, embodiments of the invention may be practiced in conjunction with a graphics library, other operating systems, or any other application program and is not limited to any particular application or system. This basic configuration is illustrated in FIG. 6 by those components within a dashed line 620.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by a removable storage 609 and a non-removable storage 610. Computer storage media may include volatile and nonvolatile, removable and non-removable media implemented in any method or technology for storage of information, such as computer readable instructions, data structures, program modules, or other data. System memory 604, removable storage 609, and non-removable storage 610 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 600. Any such computer storage media may be part of device 600. Computing device 600 may also have input device(s) 612 such as a keyboard, a mouse, a pen, a sound input device, a camera, a touch input device, etc. Output device(s) 614 such as a display, speakers, a printer, etc. may also be included. Computing device 600 may also include a vibration device capable of initiating a vibration in the device on command, such as a mechanical vibrator or a vibrating alert motor. The aforementioned devices are only examples, and other devices may be added or substituted.

Computing device 600 may also contain a network connection device 615 that may allow device 600 to communicate with other computing devices 618, such as over a network in a distributed computing environment, for example, an intranet or the Internet. Device 615 may be a wired or wireless network interface controller, a network interface card, a network interface device, a network adapter or a LAN adapter. Device 615 allows for a communication connection 616 for communicating with other computing devices 618. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 604, including operating system 605. While executing on processing unit 602, programming modules 606 (e.g. program module 607) may perform processes including, for example, one or more of the stages of the processes 200, 300 as described above. The aforementioned processes are examples, and processing unit 602 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method on a server for logging and recalling data gathered from a buried asset location procedure, the method comprising:
   receiving, via a communications network communicatively coupled with the server, a group of buried asset data points corresponding to a particular buried asset sought by an operator, wherein each of said buried asset data points includes geographical location data and a time and date stamp;
   storing, in an attached database, one or more records corresponding to the group of buried asset data points;
   receiving at a different time, via the communications network, a portable transmitter hookup definition associated with the group of buried asset data points, wherein the portable transmitter hookup definition includes a time and date stamp, geographical location data, and a buried asset type indicator, wherein the time and date stamp is different from the time and date stamps of the group of buried asset data points;
   searching the attached database for one or more matching records with buried asset data points having time and date stamps and geographical location data that match, within predefined parameters, the time and date stamp and the geographical location data of the portable transmitter hookup definition;
   storing, in the attached database, the portable transmitter hookup definition in association with the one or more matching records;
   creating a first data structure that represents a two dimensional area comprising a buffer zone around the geographical location data of the portable transmitter hookup definition, and storing, in the attached database, the first data structure in association with the one or more matching records;
   receiving from a mobile computing device, via the communications network, a request including current geographical location data of the mobile computing device and a buried asset type indicator;
   searching the attached database for a matching record with a buried asset type indicator and geographical location data that matches, within predefined parameters, the buried asset type indicator and current geographical location data received from the mobile computing device; and
   transmitting to the mobile computing device, via the communications network, the first data structure corresponding to the matching record.

2. The method of claim 1, wherein the step of receiving the group of buried asset data points further comprises:
   receiving the group of buried asset data points corresponding to the particular buried asset sought by the operator, wherein each of said buried asset data points further includes a depth measurement.

3. The method of claim 2, wherein the step of searching the attached database for one or more one or more matching records further comprises:
   searching the attached database for one or more matching records with buried asset data points having time and date stamps and geographical location data that match, within predefined parameters, the time and date stamp and the geographical location data of the portable transmitter hookup definition, wherein said predefined parameters comprise a maximum distance and a maximum time period.

4. The method of claim 3, wherein the step of receiving the request from the mobile computing device further comprises:
   receiving from a mobile computing device, via the communications network, a request further including a unique identifier for the particular buried asset.

5. The method of claim 4, wherein the step of transmitting the first data structure further comprises:
   transmitting to the mobile computing device, via the communications network, the group of buried asset data points corresponding to the matching record, and the portable transmitter hookup definition corresponding to the matching record.

6. A system for logging and recalling data gathered from a buried asset location procedure, the system comprising:
   a server communicatively coupled with a communications network, the server configured for:
      receiving, via the communications network, a group of buried asset data points corresponding to a particular buried asset sought by an operator, wherein each of said buried asset data points includes a time and date stamp and geographical location data;
      storing, in an attached database, one or more records corresponding to the group of buried asset data points;
      receiving at a different time, via the communications network, a portable transmitter hookup definition of a portable transmitter hookup associated with the group of buried asset data points, wherein the portable transmitter hookup definition includes a time and date stamp, geographical location data, and a buried asset type indicator, wherein the time and date stamp is different from the time and date stamps of the group of buried asset data points;
      searching the attached database for one or more matching records with buried asset data points having time and date stamps and geographical location data that match, within predefined parameters, the time and date stamp and the geographical location data of the portable transmitter hookup definition;

storing, in the attached database, the portable transmitter hookup definition in association with the one or more matching records;

creating a first data structure that represents a two dimensional area comprising a buffer zone around the geographical location data of the portable transmitter hookup definition, and storing, in the attached database, the first data structure in association with the one or more matching records;

receiving from a mobile computing device, via the communications network, a request including current geographical location data of the mobile computing device and a buried asset type indicator;

searching the attached database for a matching record with a buried asset type indicator and geographical location data that matches, within predefined parameters, the buried asset type indicator and current geographical location data received from the mobile computing device; and transmitting to the mobile computing device, via the communications network, the first data structure corresponding to the matching record; and a mobile computing device communicatively coupled with the communications network, the mobile computing device configured for:

transmitting, via the communications network, the request to the server including current geographical location data of the mobile computing device and a buried asset type indicator;

receiving from the server, via the communications network, the first data structure corresponding to the geographical location data and the buried asset type indicator received from the mobile computing device; and displaying a direction indicator directing a user to the buffer zone of the first data structure, based on the current geographical location of the mobile computing device.

7. The system of claim 6, wherein the computer system is further configured for:

displaying in the window predefined graphic icons corresponding to the buffer zone.

8. The system of claim 6, wherein the step of receiving the group of buried asset data points further comprises:

receiving the group of buried asset data points corresponding to the particular buried asset sought by the operator, wherein each of said buried asset data points further includes a depth measurement.

9. The system of claim 8, wherein the step of searching the attached database for one or more matching records further comprises:

searching the attached database for one or more matching records with buried asset data points having time and date stamps and geographical location data that match, within predefined parameters, the time and date stamp and the geographical location data of the portable transmitter hookup definition, wherein said predefined parameters comprise a maximum distance and a maximum time period.

10. The system of claim 9, wherein the step of receiving the request from the mobile computing device further comprises:

receiving from the mobile computing device, via the communications network, a request further including a unique identifier for the particular buried asset.

11. The system of claim 10, wherein the step of transmitting the first data structure further comprises:

transmitting to the mobile computing device, via the communications network, the group of buried asset data points corresponding to the matching record, and the portable transmitter hookup definition corresponding to the matching record.

12. A system for logging and recalling data gathered from a buried asset location procedure, the system comprising:

a server communicatively coupled with a communications network, the server configured for:

receiving, via the communications network, a group of buried asset data points corresponding to a particular buried asset sought by an operator, wherein each of said buried asset data points includes a time and date stamp, and a geographical coordinate;

storing, in an attached database, one or more records corresponding to the group of buried asset data points;

receiving at a different time, via the communications network, a portable transmitter hookup definition of a portable transmitter hookup associated with the group of buried asset data points, wherein the portable transmitter hookup definition includes a time and date stamp, a buried asset type indicator, a frequency indicator, a geographical coordinate and a precision data value corresponding to the geographical coordinate, wherein the time and date stamp is different from the time and date stamps of the group of buried asset data points;

searching the attached database for one or more matching records with buried asset data points having time and date stamps and geographical coordinates that match, within predefined parameters, the time and date stamp and the geographical coordinates of the portable transmitter hookup definition;

storing, in the attached database, the portable transmitter hookup definition in association with the one or more matching records;

creating a first data structure that represents a two dimensional area comprising a buffer zone around the geographical coordinate of the portable transmitter hookup definition, wherein a size of said area is based on the precision data value, and storing, in the attached database, the first data structure in association with the one or more matching records;

receiving from a mobile computing device, via the communications network, a request including current geographical location data of the mobile computing device and a buried asset type indicator;

searching the attached database for a matching record with a buried asset type indicator and geographical location data that matches, within predefined parameters, the buried asset type indicator and current geographical location data received from the mobile computing device; and transmitting to the mobile computing device, via the communications network, the first data structure of the matching record; and a mobile computing device communicatively coupled with the communications network, the mobile computing device configured for:

transmitting, via the communications network, the request to the server including the current geographical location data of the mobile computing device and a buried asset type indicator;

receiving from the server, via the communications network, the first data corresponding to the geographical location data and the buried asset type indicator received from the mobile computing device; and displaying a direction indicator directing a user to the buffer zone of the first data structure, based on the current geographical location of the mobile computing device.

13. The system of claim 12, wherein the computer system is further configured for:
    displaying in the window predefined graphic icons corresponding to the buffer zone of the first data structure.

14. The system of claim 12, wherein the step of receiving the group of buried asset data points further comprises:
    receiving the group of buried asset data points corresponding to the particular buried asset sought by the operator, wherein each of said buried asset data points further includes a depth measurement.

15. The system of claim 14, wherein the step of searching the attached database for one or more matching records further comprises:
    searching the attached database for one or more matching records with buried asset data points having time and date stamps and geographical coordinates that match, within predefined parameters, the time and date stamp and the geographical coordinate of the portable transmitter hookup definition, wherein said predefined parameters comprise a maximum distance and a maximum time period.

16. The system of claim 15, wherein the step of receiving the request from the mobile computing device further comprises:
    receiving from the mobile computing device, via the communications network, a request further including a unique identifier for the particular buried asset.

17. The system of claim 16, wherein the step of transmitting the first data structure further comprises:
    transmitting to the mobile computing device, via the communications network, the group of buried asset data points corresponding to the matching record, and the portable transmitter hookup definition corresponding to the matching record.

* * * * *